(12) United States Patent
Katou et al.

(10) Patent No.: US 11,968,465 B2
(45) Date of Patent: Apr. 23, 2024

(54) SOLID-STATE IMAGE SENSING DEVICE INCLUDING A COLUMN-PARALLEL A/D CONVERTING CIRCUIT

(71) Applicant: RENESAS ELECTRONICS CORPORATION, Tokyo (JP)

(72) Inventors: Norihito Katou, Tokyo (JP); Fukashi Morishita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/841,183

(22) Filed: Jun. 15, 2022

(65) Prior Publication Data

US 2022/0408046 A1 Dec. 22, 2022

(30) Foreign Application Priority Data

Jun. 22, 2021 (JP) .................................. 2021-103653

(51) Int. Cl.
*H04N 25/75* (2023.01)
*H03M 1/56* (2006.01)
*H04N 25/616* (2023.01)
*H04N 25/77* (2023.01)

(52) U.S. Cl.
CPC ............ *H04N 25/75* (2023.01); *H04N 25/77* (2023.01)

(58) Field of Classification Search
CPC ...... H04N 25/75; H04N 25/77; H04N 25/616; H03M 1/56; H03M 3/384
See application file for complete search history.

(56) References Cited

U.S. PATENT DOCUMENTS

| 6,937,279 | B1 * | 8/2005 | Kim ...................... | H04N 25/75 348/308 |
| 7,683,307 | B2 * | 3/2010 | Kawaguchi ............ | H04N 25/75 250/208.1 |
| 9,986,193 | B2 * | 5/2018 | Wakabayashi ....... | H04N 25/616 |
| 11,115,614 | B2 | 9/2021 | Iizuka et al. | |

(Continued)

FOREIGN PATENT DOCUMENTS

| JP | 2020-096300 A | 6/2020 |
| JP | 2020-120310 A | 8/2020 |

OTHER PUBLICATIONS

US 11,019,238 B2, 05/2021, Cho (withdrawn)*

*Primary Examiner* — Marly S Camargo
(74) *Attorney, Agent, or Firm* — Rimon P.C.

(57) ABSTRACT

A technique capable of improving linearity at a low illuminance is provided. A solid-state sensing image device includes: a pixel array including a plurality pixels arranged in a matrix form and a plurality of pixel signal lines connected to the plurality of pixels and receiving pixel signals supplied from the plurality pixels; a column-parallel A/D converting circuit connected to the plurality of pixel signal lines; and a reference-voltage generating circuit generating ramp-wave reference voltage that linearly changes in accordance with time passage. The column-parallel A/D converting circuit includes a first A/D converter, the first A/D converter includes: a first input terminal connected to the pixel signal line; a second input terminal receiving the reference voltage; and an offset generating circuit connected to the first input terminal and generating an offset voltage for the first input terminal.

7 Claims, 13 Drawing Sheets

(56) References Cited

U.S. PATENT DOCUMENTS

| | | | |
|---|---|---|---|
| 2005/0253942 A1* | 11/2005 | Muramatsu | H04N 9/03 348/273 |
| 2007/0146514 A1* | 6/2007 | Maeda | H04N 25/75 348/294 |
| 2017/0171487 A1* | 6/2017 | Wakabayashi | H04N 25/616 |
| 2020/0244908 A1 | 7/2020 | Matsumoto et al. | |

* cited by examiner

SOLID-STATE IMAGE SENSING DEVICE INCLUDING A COLUMN-PARALLEL A/D CONVERTING CIRCUIT

CROSS-REFERENCE TO RELATED APPLICATION

The disclosure of Japanese Patent Application No. 2021-103653 filed on Jun. 22, 2021, including the specification, drawings and abstract is incorporated herein by reference in its entirety.

BACKGROUND

The present invention relates to a solid-state image sensing device, and relates to a technique effectively applied to a solid-state image sensing device such as a CMOS (Complementary Metal Oxide Semiconductor) image sensor including an analog/digital converter (also referred to as A/D converting circuit).

There are disclosed techniques listed below.
[Patent Document 1] Japanese Unexamined Patent Application Publication No. 2020-96300
[Patent Document 2] Japanese Unexamined Patent Application Publication No. 2020-120310

A CMOS image sensor That is a solid-state image sensing device is made of a plurality of pixels arranged in a matrix form and a peripheral circuit. The peripheral circuit includes a row selecting circuit for supplying a pixel selecting signal to each row and a column readout circuit for acquiring a pixel signal from each column. The column readout circuit includes a plurality of A/D converting circuits arranged for each column. As the column readout circuit, an A/D converting circuit of a correlated double sampling system may be used in some cases. For example, Japanese Unexamined Patent Application Publication No. 2020-96300 and Japanese Unexamined Patent Application Publication No. 2020-120310 are suggested for the CMOS image sensor.

Monitor cameras in dark environment (at a low illuminance) acquire white and black images by emitting infrared rays. In recent years, high-sensitivity image sensors capable of capturing color images even at the low illuminance have been actively developed. A linearity performance at the low illuminance is very important for acquiring images with high color reproducibility in the dark environment.

SUMMARY

In the converting operation of the A/D converting circuit using the digital correlated double sampling (DCDS), circuit offset can be removed by acquiring an output image in a really dark state (referred to as first analog/digital (A/D) conversion) first, and then, subtracting the dark image from an output image in an illumination state (referred to as second A/D conversion).

Since the pixel signal is reset in the first A/D conversion, applications of input voltages of the A/D converting circuits of all columns are almost the same, and the A/D converting circuits of all columns are simultaneously driven when the A/D converting circuits shift. Therefore, a potential of a power supply voltage and a potential of a ground voltage that are supplied to the A/D converting circuits of all columns largely shift (large IR-drop occurs). In this manner, an output through rate of a comparing circuit in the A/D converting circuit is largely blunts.

On the other hand, since the pixel signal of each column is input to each of the A/D converting circuits of all columns in the second A/D conversion, a shift timing varies among the A/D converting circuits of all columns, and thus, changes of the potential of the power supply voltage and the potential of the ground voltage supplied to the A/D converting circuits of all columns are small (only small IR-drop occurs).

A latch timing of a counter shifts by delay increase due to the blunt output through rate in the first A/D conversion, and the result of the A/D conversion contains an error. The influence of this error is large particularly at the low illuminance, and therefore, the linearity at the low illuminance deteriorates. As a result, the color balance and the shading correction accuracy deteriorate.

An object of the present invention is to provide a technique capable of improving the linearity at the low illuminance.

Other objects and novel characteristics will be apparent from the description of the present specification and the accompanying drawings.

The summary of the typical aspects of the disclosed inventions will be briefly described as follows:

According to one embodiment, a solid-state sensing image device includes: a pixel array including a plurality of pixels arranged in a matrix form and a plurality of pixel signal lines connected to the plurality of pixels and receiving pixel signals supplied from the plurality of pixels; a column-parallel A/D converting circuit connected to the plurality of pixel signal lines; and a reference-voltage generating circuit generating a ramp-wave reference voltage that linearly changes in accordance with time passage, the column-parallel A/D converting circuit includes a first A/D converter, and the first A/D converter includes: a first input terminal connected to the pixel signal line; a second input terminal receiving the reference voltage; and an offset generating circuit connected to the first input terminal and generating an offset voltage for the first input terminal.

In the solid-state sensing image device of the one embodiment, the linearity at the low illuminance can be improved.

BRIEF DESCRIPTIONS OF THE DRAWINGS

DETAILED DESCRIPTION

Hereinafter, embodiments will be described with reference to the accompanying drawings. Note that the same components are denoted by the same reference signs in the following explanations, and the repetitive description thereof will be omitted. Note that the drawings may be schematically illustrated in comparison to the practical aspects for making the explanations clearer. However, the illustration is only an example, and does not limit the interpretation of the present invention.

First Embodiment

<Configuration of Image Sensor>

Figure 1:
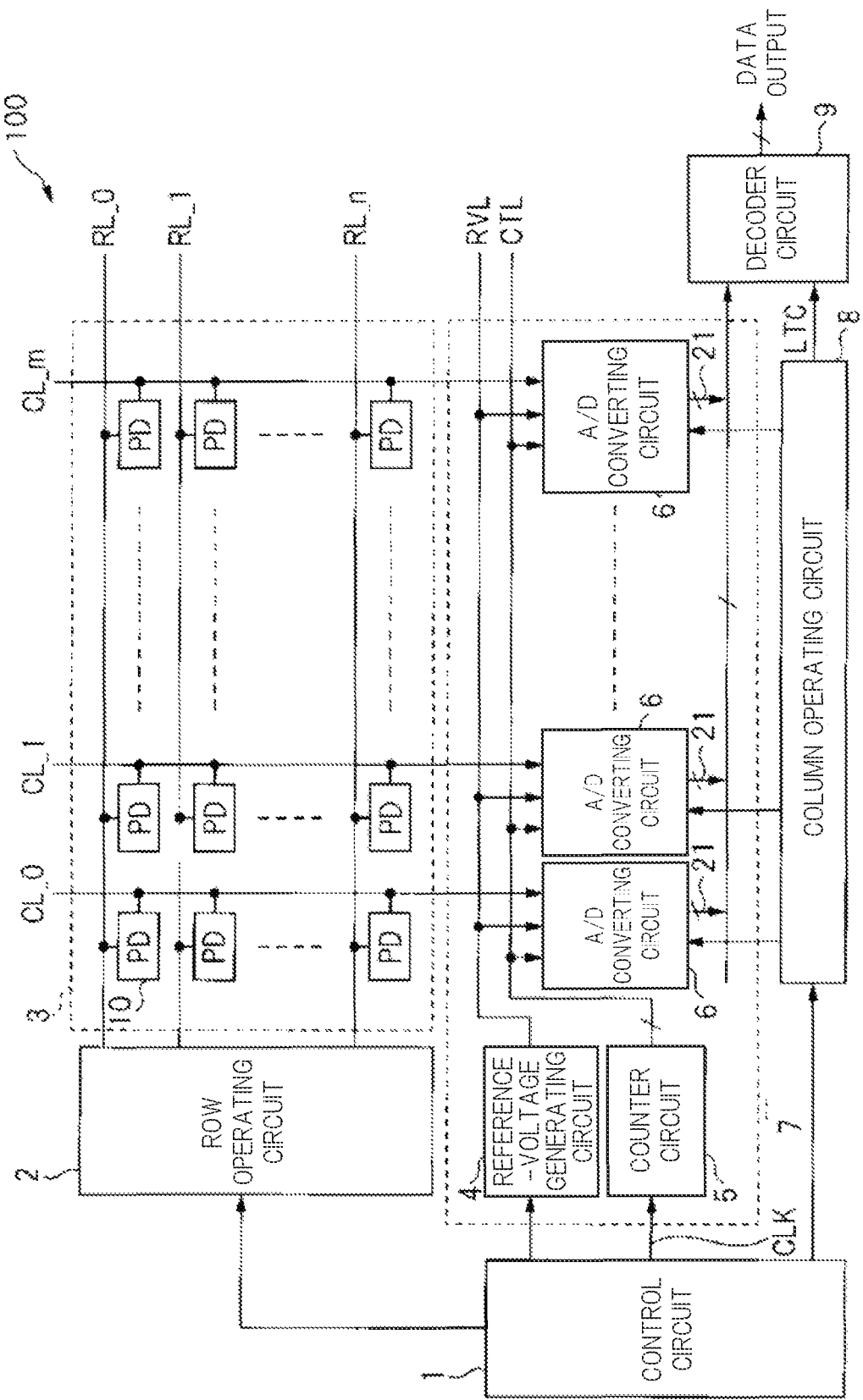
FIG. 1 is a block diagram showing a configuration of an image sensor in a first embodiment.

FIG. 1 is a block diagram showing a configuration of an image sensor in a first embodiment. An image sensor 100 functioning as the solid-state sensing image device includes: a control circuit 1; a row operating circuit 2; a pixel unit (also referred to as pixel array) 3; a column A/D converting circuit 7; a column operating circuit 8; and a decoder 9. In the first embodiment, the pixel unit 3 and the above-described circuits configuring the image sensor 100 are formed on one semiconductor chip by a publicly-known semiconductor manufacturing technique. In other words, one semiconductor device includes the pixel unit 3 and the above-described circuits. The column A/D converting circuit 7 is also referred to as a column-parallel A/D converting circuit.

The pixel unit 3 includes: a plurality of photosensitive elements 10 arranged in a matrix form; row control lines RL_0 to RL_n arranged at respective rows of the pixel unit 3; and column signal lines CL_0 to CL_m arranged at respective columns of the pixel unit 3. The photosensitive element 10 includes, for example, a photodiode PD, and is connected to a row control line arranged at a corresponding row and a column signal line arranged at a corresponding column.

The row operating circuit 2 is connected to the row control lines RL_0 to RL_n arranged at respective rows of the pixel unit 3, and controls the operation timings of the respective rows of the pixel unit 3. The row operating circuit 2 sequentially selects a row control line from the plurality of row control lines RL_0 to RL_n when, for example, acquiring an image, and supplies a row control signal to the selected row control line. In this manner, a plurality of photosensitive elements 10 connected to the row control lines receiving the supplied row control signals are selected from the plurality of photosensitive elements 10 arranged in the pixel unit 3. In the selected photosensitive element 10, electrons of the photodiode PD are excited by light, and an analog signal (also referred to as pixel signal) depending on the light is output to the column signal lines CL_0 to CL_m. The column signal lines CL_0 to CL_m are connected to the column A/D converting circuit 7, and the analog signal that is the pixel signal depending on the light and that is supplied to the column signal lines CL_0 to CL_m is converted into a corresponding digital signal by the column A/D converting circuit 7.

The column operating circuit 8 is connected to the column A/D co le, the column operating circuit 8 controls the column A/D converting circuit 7 so that the digital signal converted by the column A/D converting circuit 7 is sequentially supplied to the decoder circuit 9. The decoder circuit 9 decodes the digital signal supplied from the column A/D converting circuit 7, and outputs it as a count value.

The control circuit 1 performs general control. For example, the control circuit 1 controls a timing for operating the row operating circuit 2 and the column operating circuit 8. As explained later, the control circuit 1 controls an operation of the reference-voltage generating circuit 4 in the column A/D converting circuit 7, and supplies a clock signal CLK to a counter circuit 5 in the column A/D converting circuit 7.

The column A/D converting circuit 7 includes: a plurality of A/D converting circuits 6 corresponding to the respective columns of the pixel unit 3; the reference-voltage generating circuit 4; and the counter circuit 5. The A/D converting circuits 6 are connected to the column signal lines arranged at the corresponding columns of the pixel unit 3, respectively. The reference-voltage generating circuit 4 generates the ramp-wave reference voltage that directly changes in accordance with the time passage, and supplies a common reference voltage VRAMP to the A/D converting circuit 6 corresponding to each column through a common reference-voltage line RVL. The counter circuit 5 generates a plurality of bit counter signals based on the clock signal CLK output of the control circuit 1, and outputs it to a counter signal line CTL arranged along the row of the pixel unit 3. The A/D converting circuit 6 corresponding to each column is connected to the counter signal line CTL, and the counter signal that is generated by the counter circuit 5 is distributed to the A/D converting circuit 6 corresponding to each column.

Since the common reference voltage VRAMP is supplied and the common counter signal is distributed to the A/D converting circuit 6 corresponding to each column, the A/D converting circuit 6 corresponding to each column can simultaneously convert the analog signals suppled through the column signal lines CL_0 to CL_M into the digital signals.

In FIG. 1, a term "LTC" shows the latch signal. The control circuit 1 notifies the column operating circuit 8 that the ramp-wave reference voltage VRAMP has reached a predetermined voltage and returned to an initial voltage, and the column operating circuit 8 generates the latch signal LTC. The A/D converting circuit 6 outputs the digital signal corresponding to the analog signal to an output line 21. Since the digital signal is supplied to the decoder circuit 9 when the ramp-wave reference voltage returns to the initial voltage, the decoder circuit 9 latches the digital signal at a timing of the supply of the latch signal LTC, and decodes the latched digital signal. In this drawing, note that the latch signal LTC is output from the column operating circuit 8. However, the latch signal LTC may be output from the column A/D converting circuit 7, the reference-voltage generating circuit 4 or the control circuit 1.

In FIG. 1, a line that is illustrated to cross a line means that the number of the line is plural. For example, a cross line "/" is illustrated on the line of the counter signal CTL, and therefore, the counter signal line CTL means a plurality of counter signal line. On the other hand, the cross line is not illustrated on the reference-voltage line RVL, and therefore, the reference-voltage line means one wiring.

Figure 2:
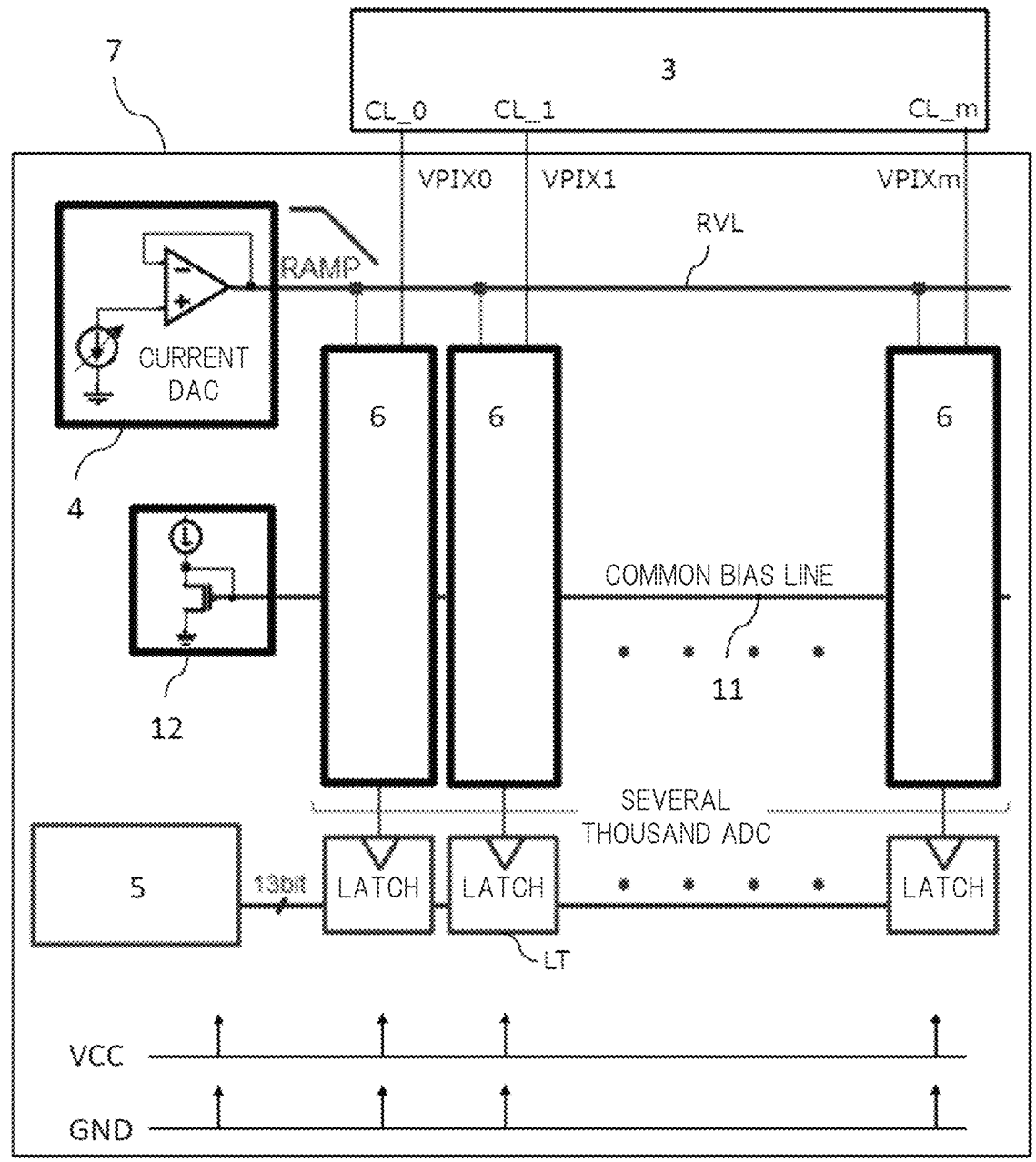
FIG. 2 is a block diagram showing a configuration of a column A/D converting circuit in the first embodiment.

FIG. 2 is a block diagram showing a configuration of the column A/D converting circuit in the first embodiment. The column A/D converting circuit 7 includes: a plurality of A/D converting circuits 6 corresponding to the respective columns of the pixel unit 3; the reference-voltage generating circuit 4; the counter circuit 5; a bias circuit 12; and a plurality of latch circuits LT. A bias voltage that is generated by the bias circuit 12 is supplied to the plurality of A/D converting circuits 6 through a common bias line 11. The column signal lines CL_0 to CL_m of the pixel unit 3 are connected to the respective A/D converting circuits 6 to be pixel signal lines VPIX0 to VPIXm. An output of each of the A/D converting circuits 6 is connected to the latch circuit LT. As shown in FIG. 2, a power supply potential VCC that is a first reference power supply potential having a high potential and a ground voltage GND that is a second reference potential having a low potential are supplied as power supplies to each circuit of the A/D converting circuit.

Figure 3:
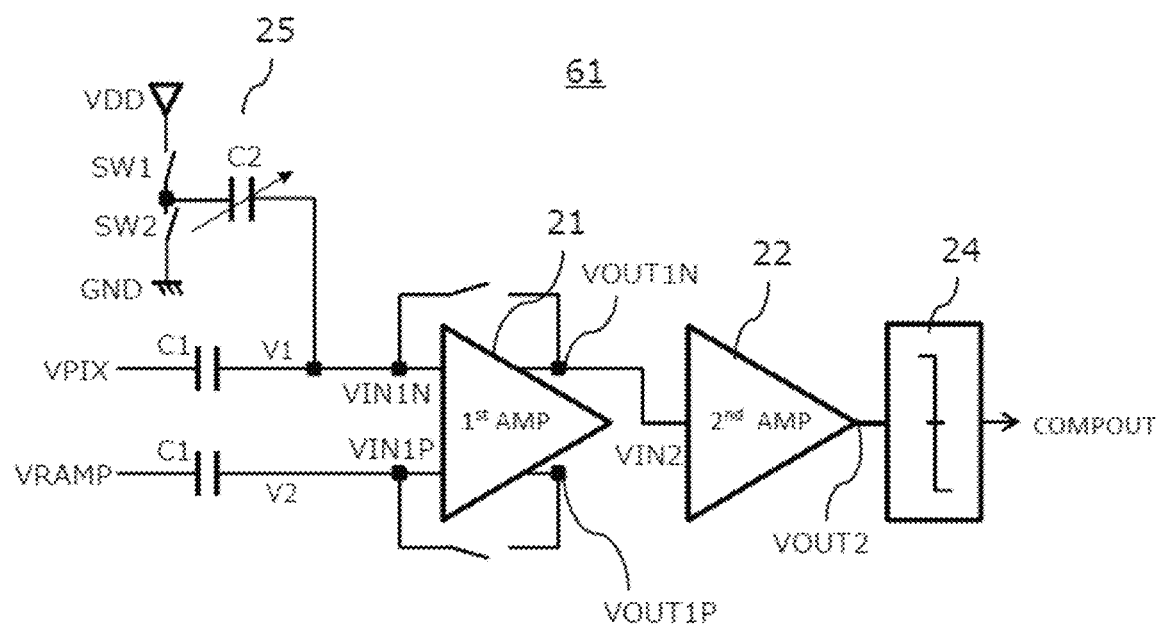
FIG. 3 is a block diagram showing a configuration of a first A/D converting circuit in the first embodiment.
Figure 4:
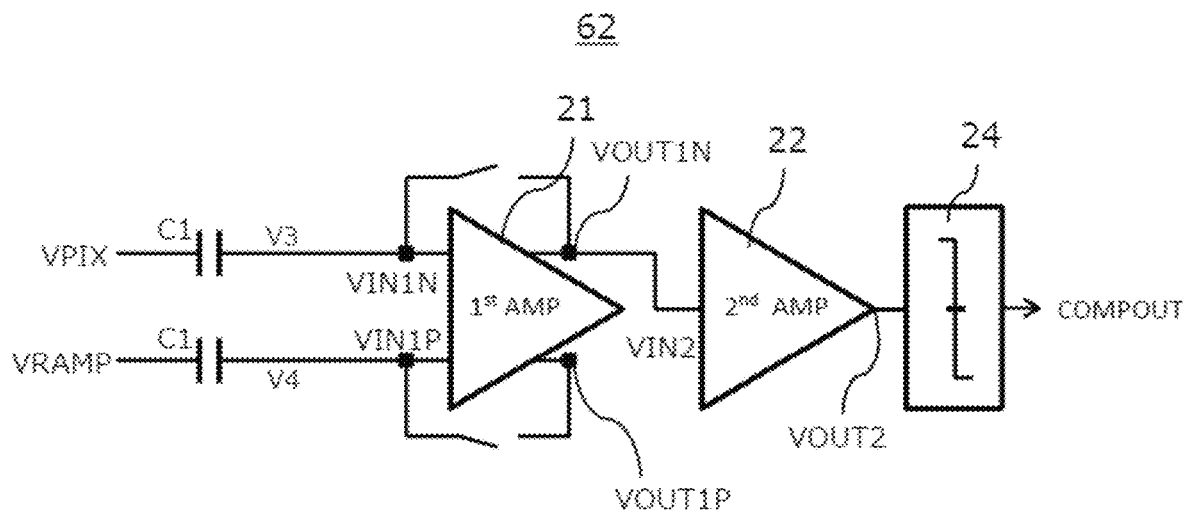
FIG. 4 is a block diagram showing a configuration of a second A/D converting circuit in the first embodiment.
Figure 5:
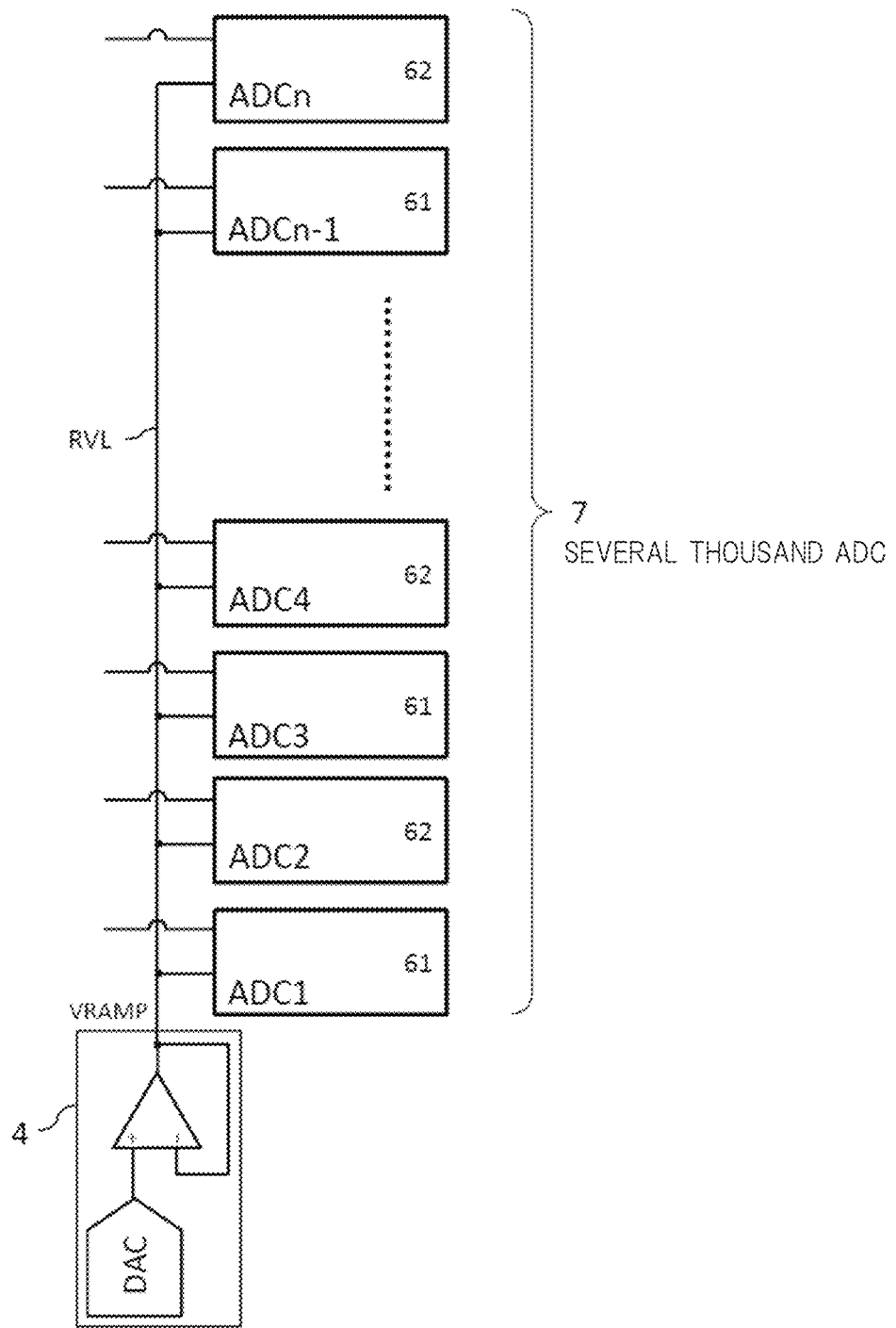
FIG. 5 is a block diagram showing a configuration of a column A/D converting circuit using both the first A/D converting circuit of FIG. 3 and the second A/D converting circuit of FIG. 4 in the first embodiment.
Figure 6:
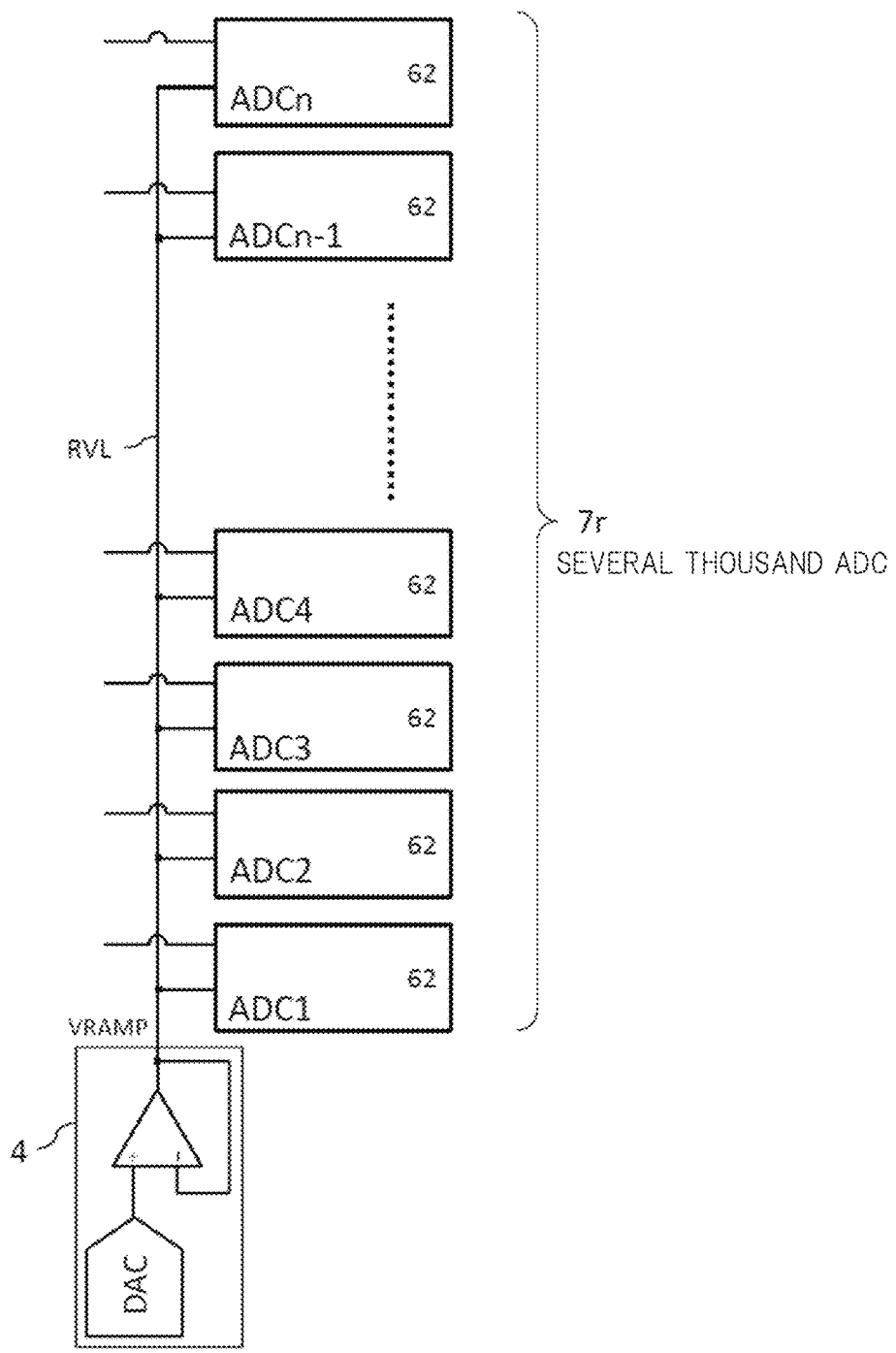
FIG. 6 is a block diagram showing a configuration of a column A/D converting circuit using only the second A/D converting circuit of FIG. 4 in a comparative example.

FIG. 3 is a block diagram showing a configuration of a first A/D converting circuit in the first embodiment. FIG. 4 is a block diagram showing a configuration of a second A/D converting circuit in the first embodiment. FIG. 5 is a block diagram showing a configuration of a column A/D converting circuit using both the first A/D converting circuit of FIG. 3 and the second A/D converting circuit of FIG. 4 in the first embodiment. FIG. 6 is a block diagram showing a configuration of a column A/D converting circuit using only the second A/D converting circuit of FIG. 4 in a comparative example.

As shown in FIG. 3, the first A/D converting circuit (first A/D converter) 61 includes: single- or plural-preamplifiers; a binary circuit 24; and an offset generating circuit 25. The first A/D converting circuit 61 is an A/D converting circuit using digital correlated double sampling (DCDS). A double-stage preamplifier made of a first amplifier 21 and a second amplifier 22 is exemplified as the example of FIG. 3. A comparative output COMPOUT of the binary circuit 24 is configured to be supplied to the latch circuit LT of FIG. 2.

Each of connections between the pixel signal line VPIX and a first input terminal VIN1N of the first amplifier 21 and between an input terminal VIN1P and the reference-voltage line RVL receiving the supplied reference voltage VRAMP is made through a capacitor C1. An output terminal VOUT1N of the first amplifier 21 is connected to an input terminal VIN2 of the second amplifier 22. An output terminal VOUT2 of the second amplifier 22 is connected to an input of the binary circuit 24. A switch is arranged between the input terminal VTN1N of the first amplifier 21 and the output terminal VOUT1N of the first amplifier 21 and between the second input terminal VIN1P of the first amplifier 21 and the output terminal VOUT1P of the first amplifier 21. Therefore, operation at a suitable operation point for the first amplifier not depending on an external signal DC level can be made by an automatic zero operation that closes the switch inserted between the input and output terminals oi the first amplifier 21. The bias voltage is supplied from the common bias line 11 of FIG. 2 to the second amplifier 22.

The offset generating circuit 25 is connected to the first input terminal VIN1N of the first amplifier 21, and is configured to be able to supply the offset potential to the first input terminal VIN1N of the first amplifier 21. The offset generating circuit 25 is made of two switch elements (a first switch element SW1 and a second switch element SW2) that are connected in series between the power supply potential VDD and the ground potential GND, and a capacitance element C2 that is connected to a gap between the first input terminal VIN1N of the first amplifier 21 and a common connection point between the first switch element SW1 and the second switch element SW2. In the example of FIG. 3, the capacitance element C2 is made of a variable capacitance element. A capacitance value of the capacitance element C2 is, for example, "4fF" value.

The offset generating circuit 25 arranged in the first A/D converting circuit of FIG. 3A is not arranged in a configuration of the second A/D converting circuit (second A/D converter) 62 shown in FIG. 4. Other configurations of the second A/D converting circuit 62 are the same as those of the first A/D converting circuit 61, and therefore, overlapping explanation will be omitted. The second A/D converting circuit 62 is also an A/D converting circuit using digital correlated double sampling (DCDS) as similar to the first A/D converting circuit 61.

As shown in FIG. 5, in the column A/C converting circuit 7 in the first embodiment, odd-numbered (odd-column) A/D converting circuits ADC1, ADC3, . . . and ADC (n−1) are made of the first A/D converting circuit 61 of FIG. 3. Even-numbered (even-column) A/D converting circuits ADC2, ADC4, . . . and ADCn are made of the second A/D converting circuit 62 of FIG. 4.

On the other hand, as shown in FIG. 6, in a column A/D converting circuit 7r in the comparative example, all A/D converting circuits ADC1 to ADCn are made of the first A/D converting circuit 62 of FIG. 4.

Note that FIG. 5 shows the example of the odd-numbered A/D converting circuits ADC1, ADC3, . . . and ADC (n−1) made of the first A/D converting circuit 61 of FIG. 3 and the even-numbered A/D converting circuits ADC2, ADC4, . . . and ADCn made of the second. A/D converting circuit 62 of FIG. 4. However, the present invention is not limited to this example. The odd-numbered A/D converting circuits ADC1, ADC3, . . . and ADC (n−1) may be made of the second A/D converting circuit 62 of FIG. 4 while the even-numbered A/D converting circuits ADC2, ADC4, . . . and ADCn may be made of the first A/D converting circuit 61 of FIG. 3. A half of the consecutive A/D converting circuits ADC1 to ADC (n/2) may be made of either one of the first A/D converting circuit 61 of FIG. 3 and the second A/D converting circuit 62 of FIG. 4 while the rest half of the consecutive A/D converting circuits ADC (n/2+1) to ADCn may be made of the other of the first A/D converting circuit 61 and the second A/D converting circuit 62. The plurality of A/D convey ting circuits in the column A/D converting circuit 7 may be classified into a plurality of groups, and a group of certain A/D converting circuits may be made of the first A/D converting circuit 61 of FIG. 3 while a group of the rest A/D converting circuits may be made of the second A/D converting circuit 62 of FIG. 4.

Figure 7:
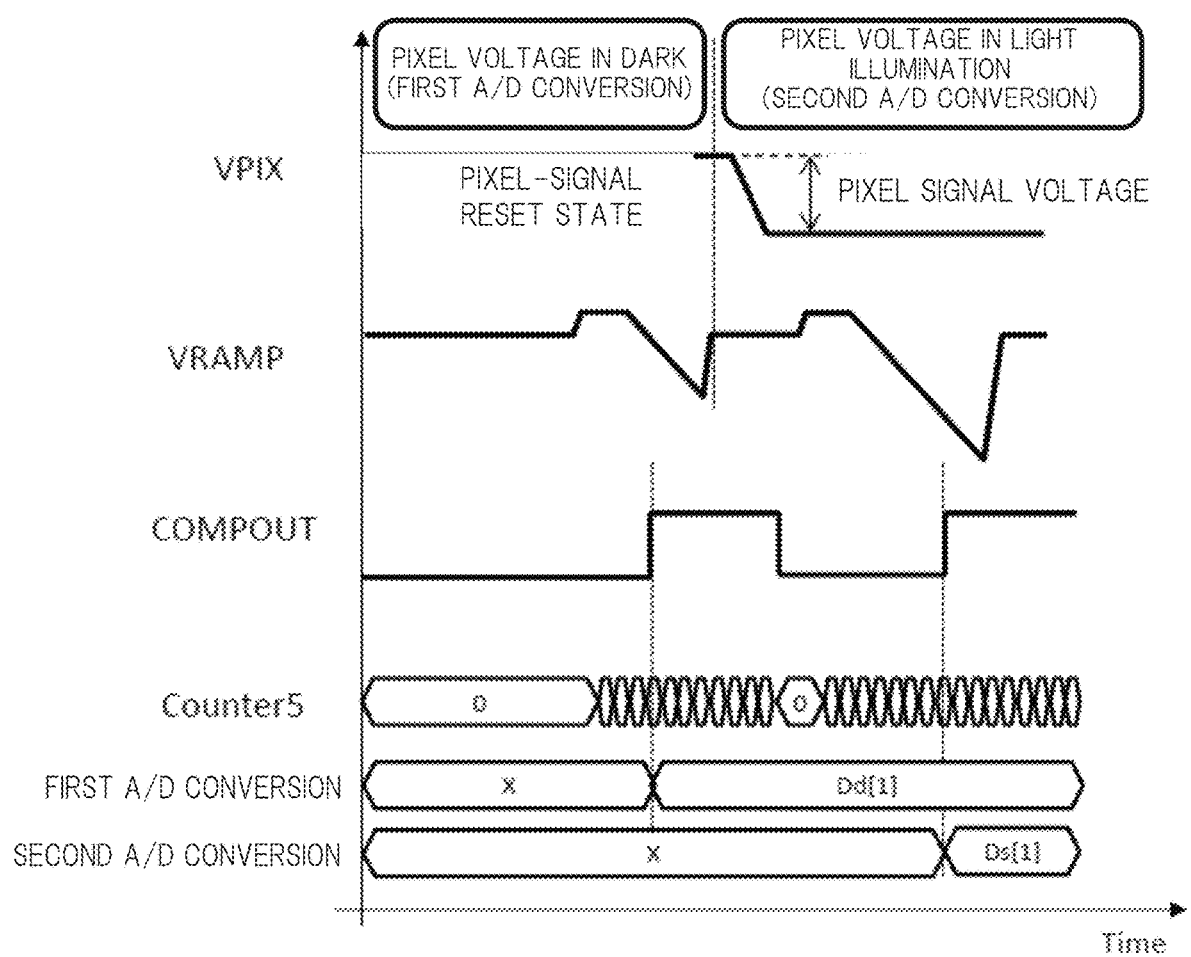
FIG. 7 is a diagram for explaining an outline of an A/D converting operation.
Figure 8:
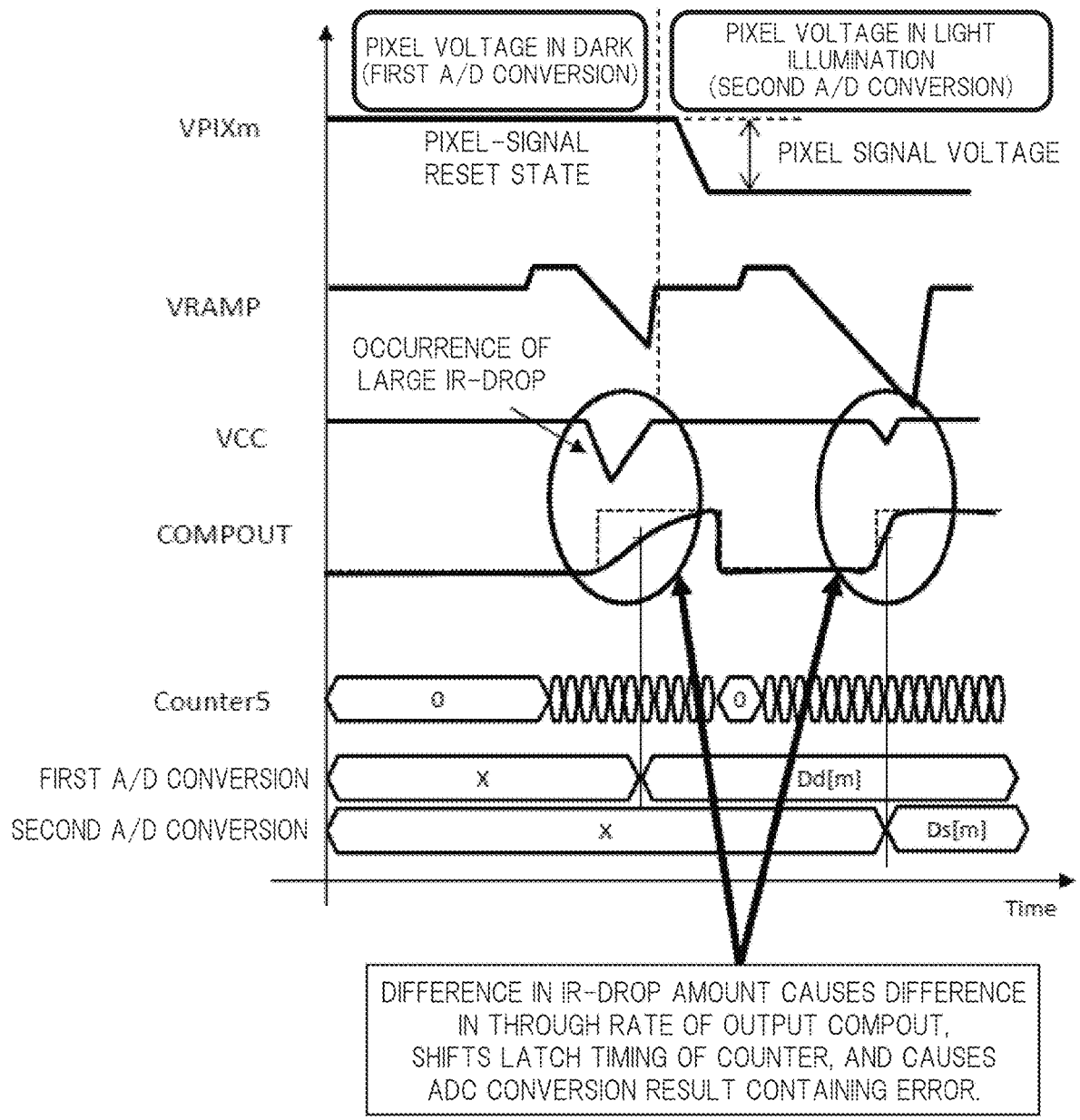
FIG. 8 is a diagram for explaining the A/D converting operation in the column A/D converting circuit of FIG. 6 of the comparative example.
Figure 9:
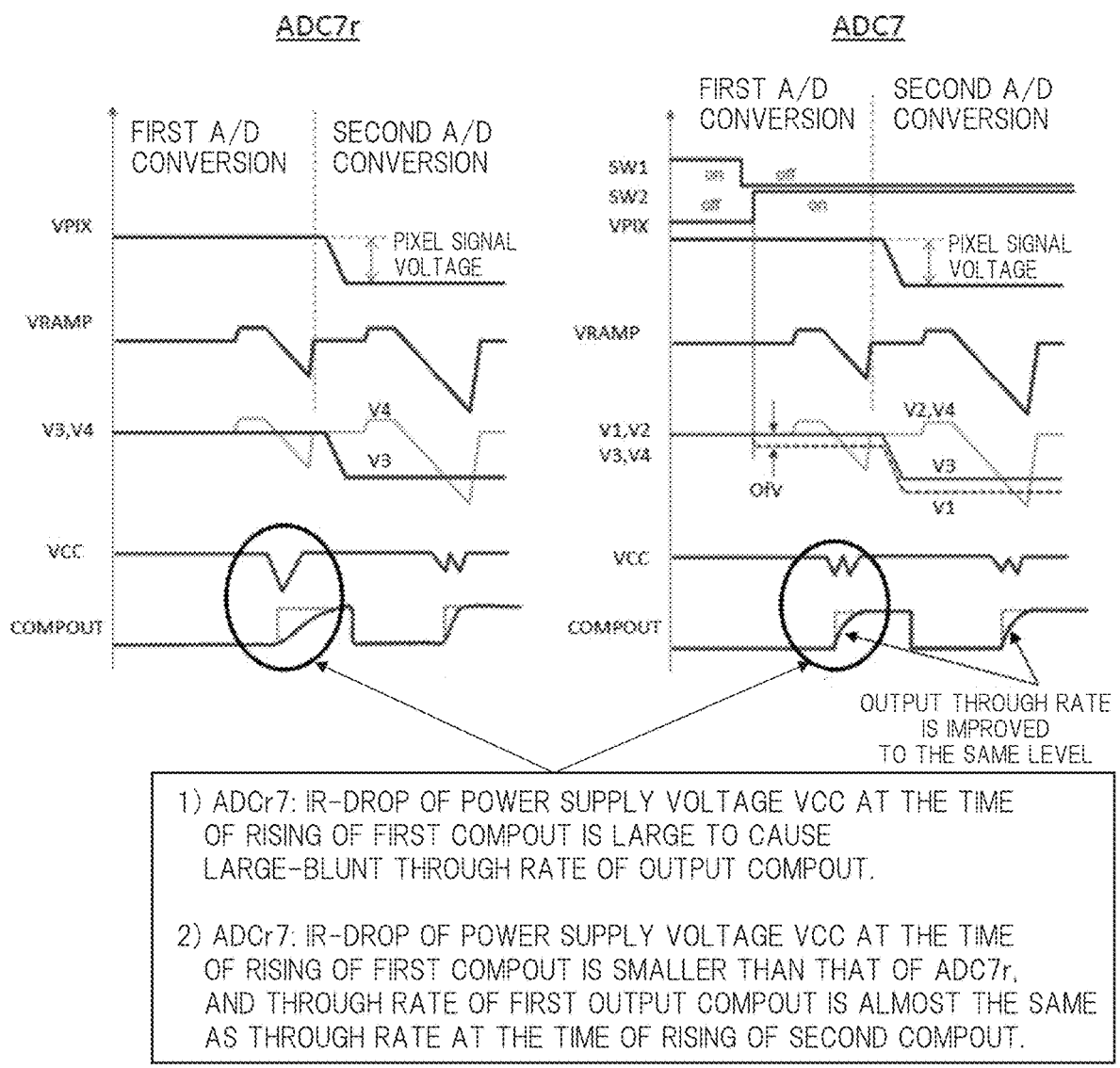
FIG. 9 is a diagram for explaining an A/D converting operation (ADC7) in a case with the column A/D converting circuit of FIG. 5 in the first embodiment and an A/D converting operation (ADC7r) in a case with the column A/D converting circuit of FIG. 6 in the comparative example.

Next, with reference to drawings, the A/D converting operation of the image sensor 100 will be explained. FIG. 7 is a diagram for explaining an outline of an A/D converting operation. FIG. 8 is a diagram for explaining the A/D converting operation in the case of the column A/D converting circuit of FIG. 6 of the comparative example. FIG. 9 is a diagram for explaining the A/D converting operation (ADC7) in a case with the column A/D converting circuit of FIG. 5 in the first embodiment and the A/D converting operation (ADC7r) in a case with the column A/D converting circuit of FIG. 6 in the comparative example.

As shown in FIG. 7, in the converting operation of the A/D converting circuit using the digital correlated double sampling (CDS), an output image (referred to as first A/D conversion) in a state of a really dark A/D converting circuit (the pixel signal is in the reset state) is acquired first as the first A/D conversion to provide a first A/D conversion result Dd[1]. Next, an output image (referred to as second A/D conversion) in a state of an illuminated A/D converting circuit is acquired as the second A/D conversion to provide a second A/D conversion result Ds[1]. Then, the dark output image is subtracted from the output image with the illumination state (Ds[1]-Ds[1]), so that an A/D conversion result from which the circuit offset is removed can be provided.

As shown in FIG. 8, in the column A/D converting circuit 7r of the comparative example, the applications of the input voltages of the second A/D converting circuits 62 of all columns are almost the same since the pixel signal is reset in the first A/D conversion, and the conversion outputs of the second A/D converting circuits 62 of all columns simultaneously shift in the same direction when the outputs of the A/D converting circuits shift. Therefore, the potential of the power supply voltage VCC, and the potential of the ground voltage GND supplied to the second A/D converting circuits 62 of all columns largely change. In other words the large IR-drop of the power supply voltage VCC or the large increase of the GND voltage is causes resistance value of the wiring through which the power supply voltage VCC is supplied or a resistance value of the wiring through which the GND voltage is supplied. Therefore, the through rate of the comparative output COMPOUT of the binary circuit 24 in the A/D converting circuit 62 largely blunts.

On the other hand, since the pixel signal in the illumination state is input in the second A/D conversion, the shift timing varies among the A/D converting circuits 62 of all columns, and the IR-drop of the power supply voltage VCC becomes small, and therefore, the through rate of the comparative output COMPOUT does not blunt in comparison to the through rate of the comparative output COMPOUT in the first A/D conversion.

A latch timing of the counter 5 shifts by delay increase due to the blunt through rate in the first A/D conversion, and the A/D conversion result after the correlated double sampling contains an error. The influence of this error is large particularly at the low illuminance, and therefore, the linearity at the low illuminance deteriorates. As a result, the color balance and the shading correction accuracy deteriorate.

The A/D converting operation ADC7 of the column A/D converting circuit 7 of FIG. 5 in the first embodiment is shown on a left side of FIG. 9, and the A/D converting operation ADC7r of the column A/D converting circuit 7r of FIG. 6 in the comparative example is shown on a right side of FIG. 9. In FIG. 9, a term "V1" indicates a potential of the input terminal VIN1N of the first amplifier 21 of the A/D converting circuit 61, and a term "V2" indicates a potential of the input terminal VIN1P of the first amplifier 21. A term "V3" indicates a potential of the input terminal VIN1N of the first amplifier 21 of the A/D converting circuit 62, and a term "V4" indicates a potential of the input terminal VIN1P of the first amplifier 21. In the A/D converting operation ADC7, the potentials V1, V2, V3 and V4 are shown, and a dot line indicates the potential V1, a solid line indicates the potential V3, and a thin solid line indicates the potentials V2 and V4. On the other hand, in the A/D converting operation ADC7r, the potentials V3 and V4 are shown, and a solid line indicates the potential V3, and a thin solid line indicates the potential V4. A potential difference between the dot-line potential V1 and the solid-line potential V3 is a potential difference of an offset potential OfV generated by the offset generating circuit 25. Regarding the first switch element SW1 and the second switch element SW2, as shown in the first A/D conversion in the A/D converting operation ADC7, the first switch element SW1 changes from an ON state to an OFF state, and the second switch element SW2 changes from an OFF state to an ON state after the first switch element SW1 changes to the OFF state. In the second A/D conversion, the first switch element SW1 is maintained in the OFF state, and the second switch element SW2 is maintained in the ON state. After the end of the second A/D conversion, the first switch element SW1 changes to the ON state, and the second switch element SW2 changes to the OFF state, and the procedure changes to the first A/D conversion on a pixel of a next row.

As shown in the A/D converting operation ADC7r, the IR-drop of the power supply voltage VCC is large at the rising of the output COMPOUT in the first A/D conversion, and the through rate of the output COMPOUT largely blunts.

On the other hand, it is found that, in the A/D converting operation ADC7, the IR-drop of the power supply voltage VCC is smaller at the rising of the output COMPOUT in the first A/D conversion than that of the A/D converting operation ADC7r, and the through rate of the output COMPOUT in the first A/D conversion is almost the same as the through rate at the rising of the output COMPOUT in the second A/D conversion.

Figure 10:
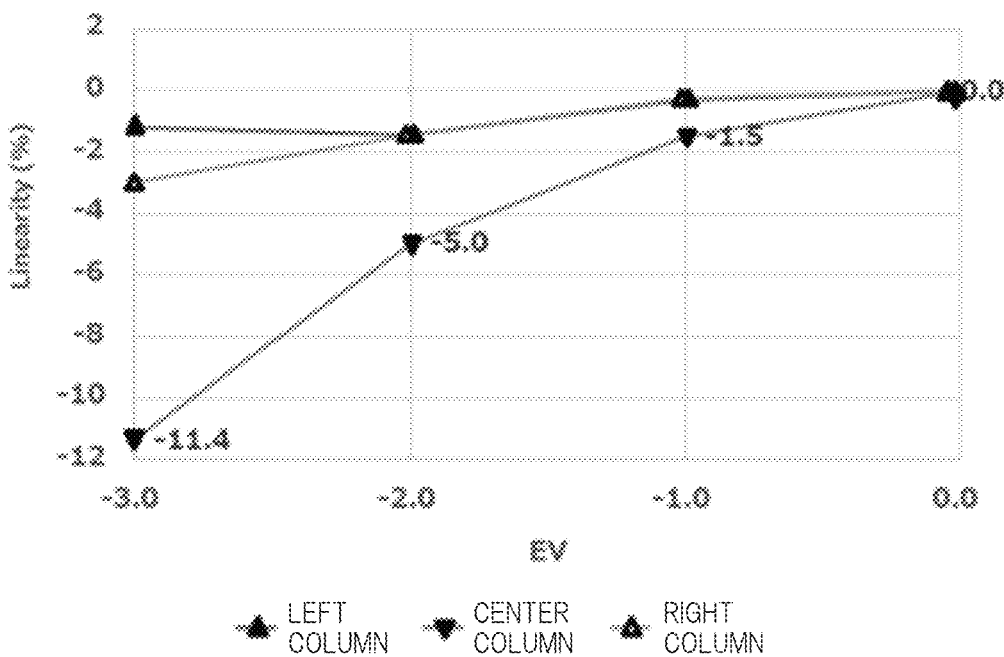
FIG. 10 is a diagram for explaining linearity of the image sensor in the first embodiment at the low illuminance.
Figure 10:
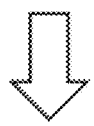
Figure 10:
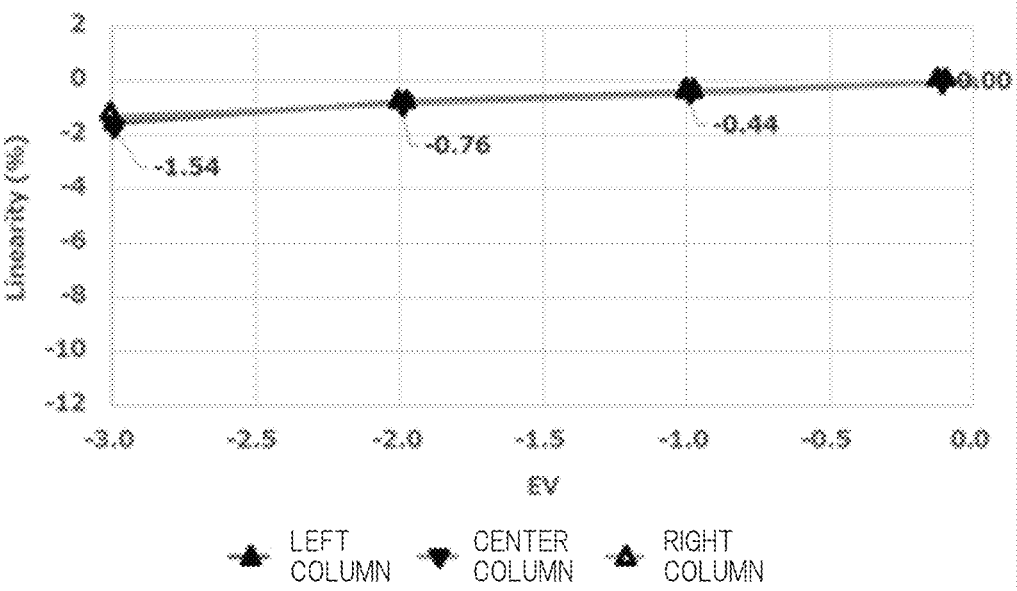
Figure 11:
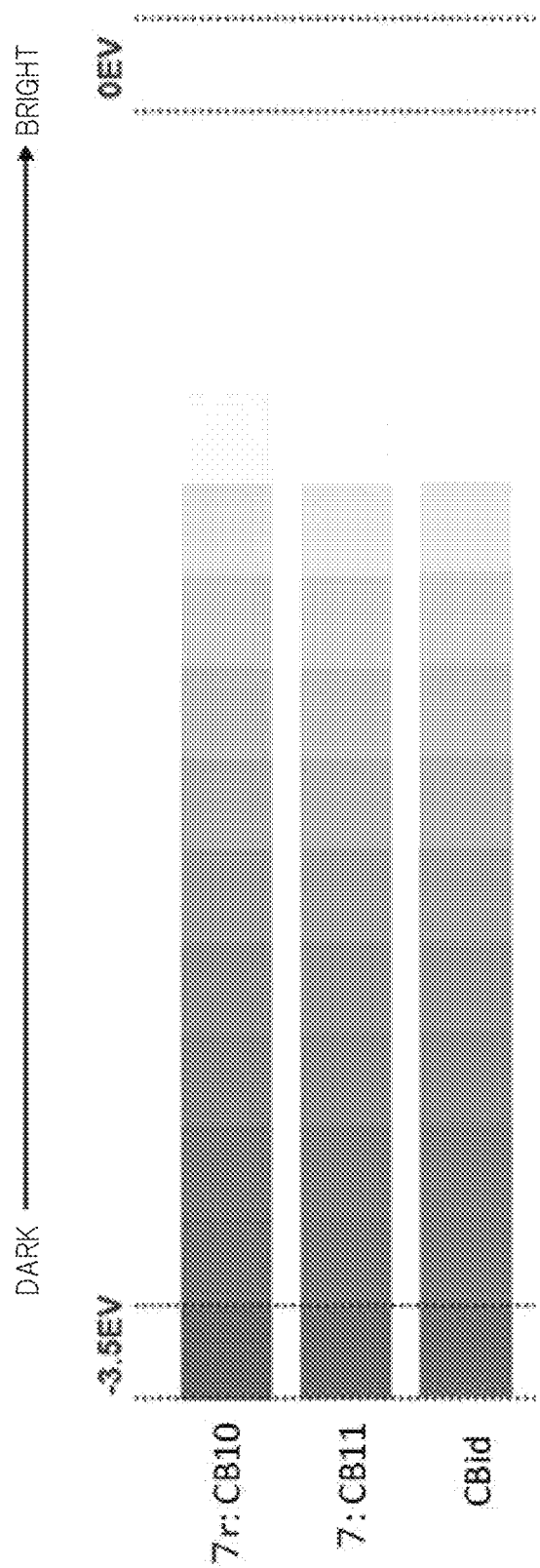
FIG. 11 is a diagram for explaining color balance of the image sensor in the first embodiment.

FIG. 10 is a diagram for explaining linearity of the image sensor in the first embodiment at the low illuminance. FIG. 11 is a diagram for explaining color balance of the image sensor 100 in the first embodiment.

As shown in FIG. 10, the image sensor 100 in the first embodiment is improved from a state of an upper graph G10 showing the linearity at the low illuminance to a state of a lower graph G11 showing the linearity at the low illuminance. The upper graph G10 showing the linearity at the low illuminance corresponds to a state of the image sensor including the A/D converting circuit 7r in the comparative example, and the lower graph G11 showing the linearity at the low illuminance corresponds to a state of the image sensor 100 including the A/D converting circuit 7 in the first embodiment. In this example, the linearity at the low illuminance is improved from −11.4% to −1.5%.

In an order from an upper side to a lower side, FIG. 11 shows color balance CB10 of the image sensor including the A/D converting circuit 7r, color balance CB11 of the image sensor including the A/D converting circuit 7, and color balance CBid having ideal linearity. Images that take entry of uniform light and are white-balanced by OEV are compared. The color balance CB10 causes the largely-unbalanced colors, and therefore, causes the unfavorable quality image. The color balance CB11 can achieve the color balance close to the color balance CBid having the ideal linearity.

According to the image sensor 100 in the first embodiment, when the even-numbered or the odd-numbered A/D converting circuit is provided with the offset generating circuit 25 to shift the shift timing in the A/D conversion, the IR-drop amount of the potential of the wiring receiving the supplied power supply potential VCC can be reduced.

Therefore, the latch timing of the counter can be prevented from shifting by the delay increase due to the blunt output through rate in the first A/D conversion. Thus, the error contained in the A/D conversion result can be reduced. Therefore, the linearity at the low illuminance can be improved. As a result, the color balance can be ideally balanced, and the shading correction accuracy can be improved.

Second Embodiment

Figure 12:
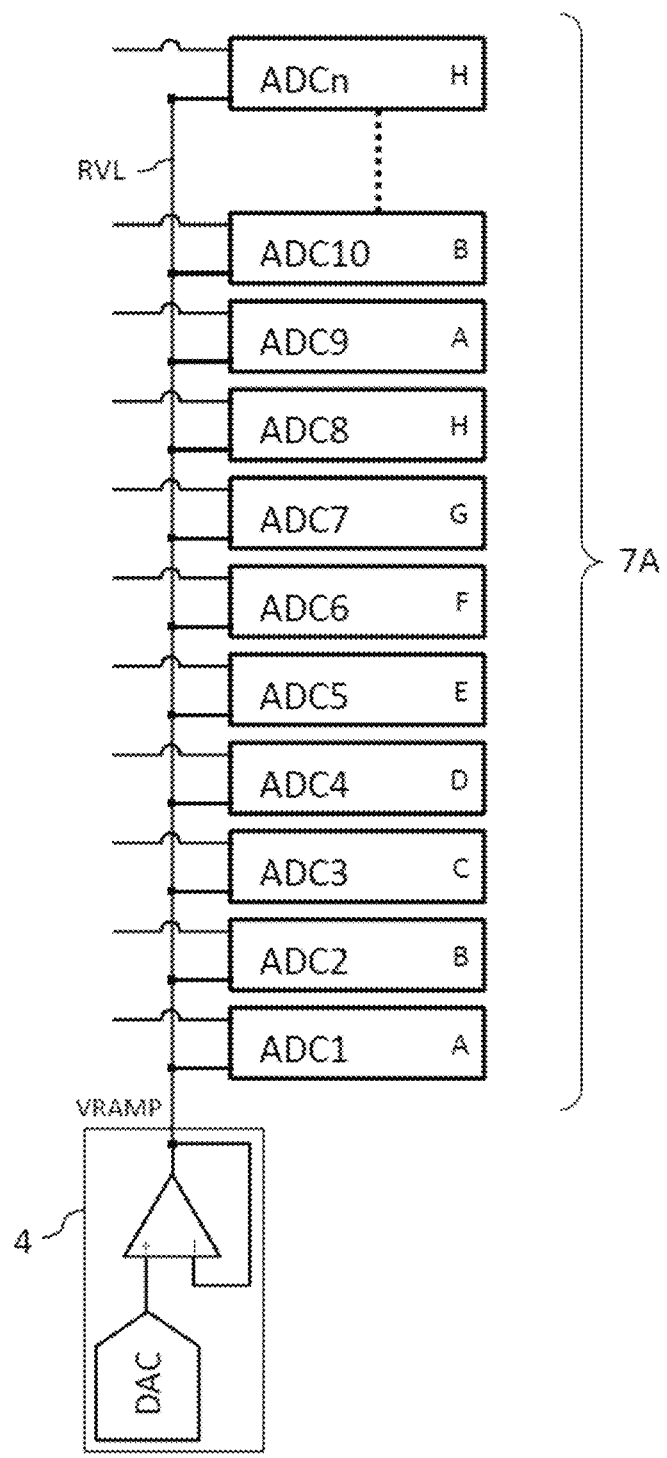
FIG. 12 is a block diagram showing a configuration of a column A/D converting circuit 7A in a second embodiment.

FIG. 12 is a block diagram showing a configuration of a column A/D converting circuit 7A in a second embodiment. The column in A/D converting circuit 7A includes a plurality of A/D converting circuits AC1 to ADCn. Each of the plurality of A/D converting circuits ADC1 to ADCn is made of the circuit configuration of the first A/D converting circuit 61 shown in FIG. 3. However, the A/D converting circuits ADC1 to ADC9 are configured to have different offset voltages A to H generated by each offset generating circuit 25. The offset voltages A to H in this example are offset voltages of eight types that are different from one another.

Figure 13:
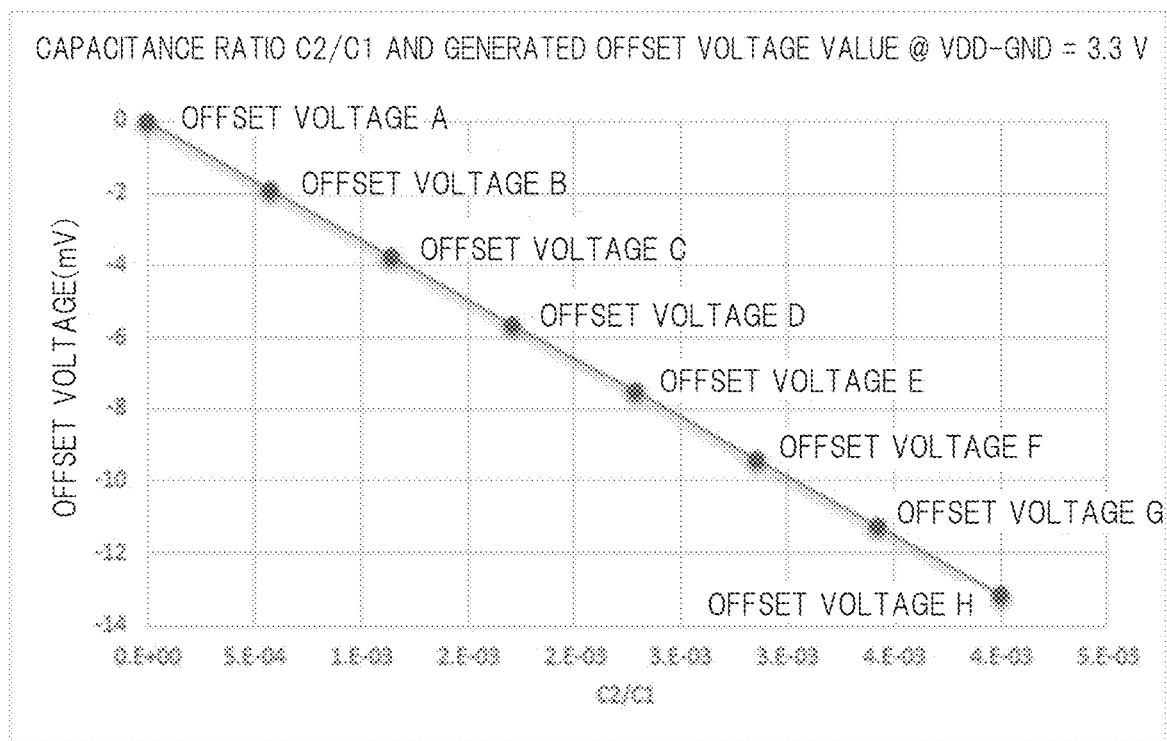
FIG. 13 is a graph showing offset voltages A to H.

FIG. 13 is a graph showing the offset voltages A to H. A vertical axis shows an offset voltage Vos (mV), and a horizontal axis shows a ratio between a capacitance element C1 and a capacitance element C2 (C2/C1). The offset voltage Vos (mV) can be acquired by the following Equation 1:

$$Vos=-(C2/(C1+C2))\cdot(VCC-GND) \quad \text{(Equation 1)}$$

In this equation, the capacitance elements C1 and C2 are the capacitance elements C1 and C2 of the first A/D converting circuit 61 shown in FIG. 3. The different offset voltages A to H are generated by making the capacitance element C1 constant while changing the capacitance value of the capacitance element C2 for each column. The number of the different offset voltages A to H is not limited to eight. The number may be two or seven, or nine or more.

The second embodiment also can provide the same effect as that of the first embodiment.

Third Embodiment

Figure 14:
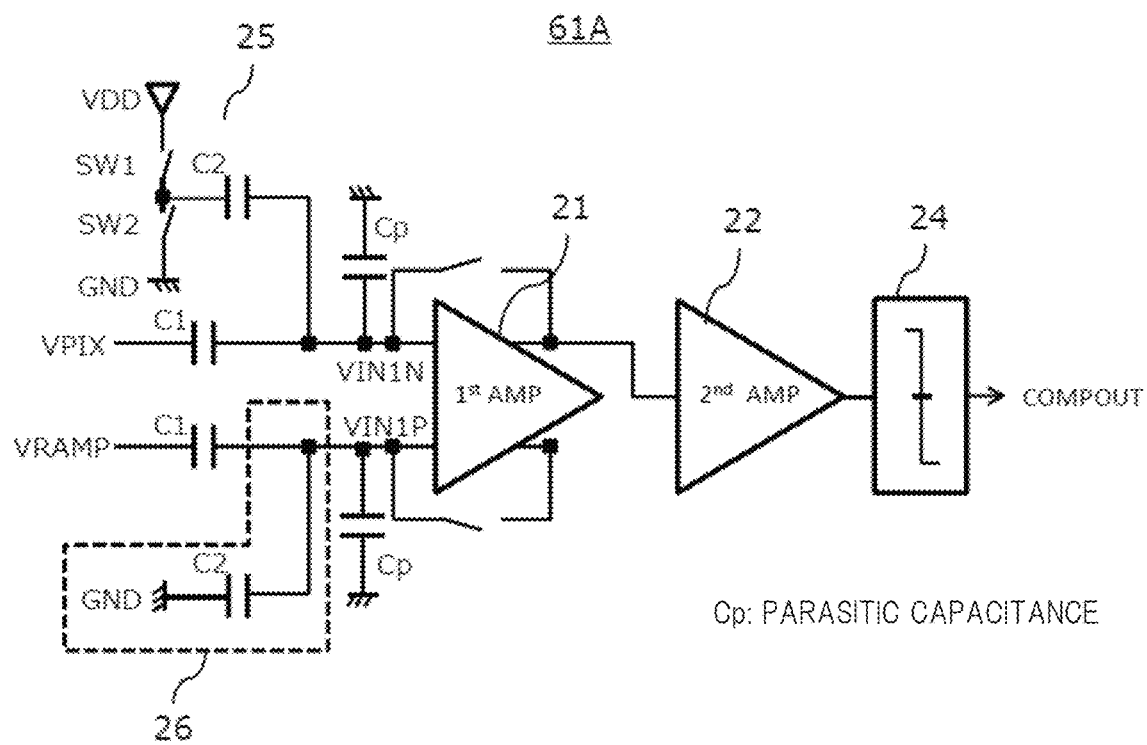
FIG. 14 is a block diagram showing a configuration of an A/D converting circuit in a third embodiment.
Figure 15:
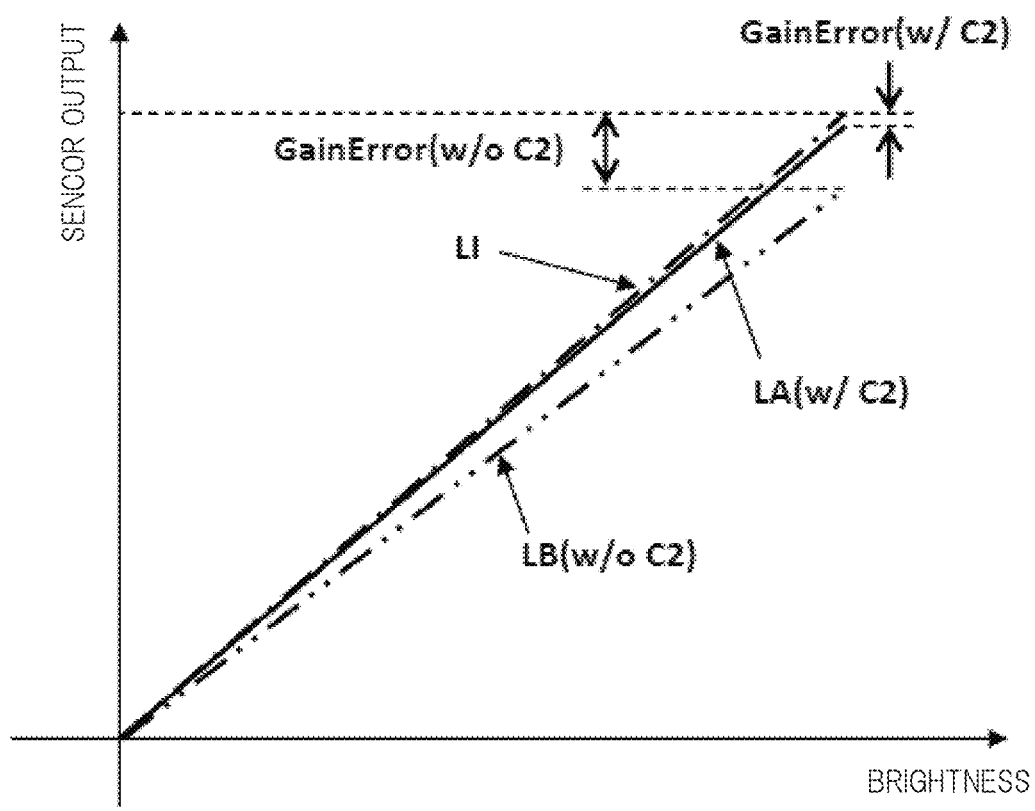
FIG. 15 is a graph for explaining improvement of gain error.

FIG. 14 is a block diagram showing a configuration of a column A/D converting circuit 61A in a third embodiment. FIG. 15 is a graph for explaining improvement of gain error.

The A/D converting circuit 61A of FIG. 14 is different from the A/D converting circuit 61 of FIG. 3 in that the A/D converting circuit 61A of FIG. 14 includes a dummy capacitance element circuit 26 connected to the input terminal VIN1P of the first amplifier 21 for improving the gain error. The dummy capacitance element circuit 26 is made of a second capacitance element C2 connected to a gap between the input terminal VIN1P of the first amplifier 21 and the ground potential GND. Other configurations of the A/D converting circuit 61A are the same as those of the A/D converting circuit 61, and therefore, the overlapping explanation will be omitted.

An equation for the gain error (that is no connection of the capacitance element C2 to the input terminal VIN1P of the first amplifier 21) of the A/D converting circuit 61 of FIG. 3 can be expressed by the following Equation 2, and the gain can be expressed by the following Equation 3:

$$GainError=Gain-1=-(C2)/(C1+C2+Cp) \quad \text{(Equation 2)}$$

$$Gain=(C1+C2)/(C1+C2+Cp) \quad \text{(Equation 3)}$$

In these Equations, a term "Cp" represents a parasitic capacitance element.

FIG. 15 shows an input/output property of the first amplifier 21 in a graph taking a sensor output on a vertical axis and brightness on a horizontal axis. A solid line LA (w/ C2) indicates a case of the connection of the capacitance element C2 to the input terminal VIN1P of the first amplifier 21 (corresponding to the A/D converting circuit 61A of FIG. 14). A dashed double-dotted line LB (w/o C2) indicates a case of no connection of the capacitance element C2 to the input terminal VIN1P of the first amplifier 21 (corresponding to the A/D converting circuit 61 of FIG. 3). A dashed dotted line LI indicates an ideal input/output property. As shown in FIG. 15, regarding the gain error, it is found that a gain error GainError (w/ C2) of the solid line LA (w/ C2) is smaller than a gain error GainError (w/o C2) of the dashed double-dotted line LB (w/o C2).

According to the third embodiment, the connection of the dummy capacitance element circuit 26 to the input terminal VIN1P of the first amplifier 21 can improve the gain error.

In the foregoing, the present invention made by the present inventors has been concretely described on the basis of the embodiments. However, the present invention is not limited to the foregoing embodiments and examples, and various modifications can be made within the scope of the present invention.

The applications of the embodiments to the image sensor have been explained. However, the present invention is applicable to an A/D converting circuit embedded in a distance sensor.

What is claimed is:

1. A solid-state sensing image device comprising:
   a pixel array including a plurality of pixels arranged in a matrix form and a plurality of pixel signal lines connected to the plurality of pixels and receiving pixel signals supplied from the plurality of pixels;
   a column-parallel A/D converting circuit connected to the plurality of pixel signal lines; and
   a reference-voltage generating circuit generating a ramp-wave reference voltage that linearly changes in accordance with time passage,
   wherein the column-parallel A/D converting circuit includes a first A/D converter,
   wherein the first A/D converter includes:
      a first input terminal connected to the pixel signal line;
      a second input terminal receiving the reference voltage; and
      an offset generating circuit connected to the first input terminal and generating an offset voltage for the first input terminal,
   wherein the offset generating circuit includes two switch elements and a capacitance element, and
   wherein the offset voltage is generated by the two switch elements and the capacitance element.

2. The solid-state sensing image device according to claim 1,
   wherein the first A/D converter performs A/D conversion using correlated double sampling.

3. The solid-state sensing image device according to claim 1,
   wherein the column-parallel A/D converting circuit includes a plurality of the first A/D converters, and
   the offset generating circuits in the plurality of first A/D converters generate offset voltages that are different from one another.

4. The solid-state sensing image device according to claim 3,
   wherein values of the capacitance elements of the offset generating circuits in the plurality of first A/D converters are different from one another.

5. A solid-state sensing image device comprising:
   a pixel array including a plurality of pixels arranged in a matrix form and a plurality of pixel signal lines connected to the plurality of pixels and receiving pixel signals supplied from the plurality of pixels;

a column-parallel A/D converting circuit connected to the plurality of pixel signal lines; and a reference-voltage generating circuit generating a ramp-wave reference voltage that linearly changes in accordance with time passage, wherein the column-parallel A/D converting circuit includes a first A/D converter, wherein the first A/D converter includes:
 a first input terminal connected to the pixel signal line;
 a second input terminal receiving the reference voltage; and
 an offset generating circuit connected to the first input terminal and generating an offset voltage for the first input terminal, wherein the column-parallel A/D converting circuit includes a second A/D converter, and wherein the second A/D converter includes:
 a first input terminal connected to the pixel signal line but not connected to the offset generating circuit; and
 a second input terminal receiving the reference voltage.

6. The solid-state sensing image device according to claim 5,
wherein either one of an even-numbered column and an odd-numbered column of the column-parallel A/D converting circuit is made of the first A/D converter, and the other of the even-numbered column and the odd-numbered column of the column-parallel A/D converting circuit is made of the second A/D converter.

7. A solid-state sensing image device comprising:
a pixel array including a plurality of pixels arranged in a matrix form and a plurality of pixel signal lines connected to the plurality of pixels and receiving pixel signals supplied from the plurality of pixels;

a column-parallel A/D converting circuit connected to the plurality of pixel signal lines; and a reference-voltage generating circuit generating a ramp-wave reference voltage that linearly changes in accordance with time passage, wherein the column-parallel A/D converting circuit includes a first A/D converter, wherein the first A/D converter includes:
 a first input terminal connected to the pixel signal line;
 a second input terminal receiving the reference voltage; and
 an offset generating circuit connected to the first input terminal and generating an offset voltage for the first input terminal, and wherein the solid-state sensing image device further comprises a second capacitance element connected to the second input terminal of the first A/D converter and a ground potential.

* * * * *